(12) United States Patent
Dobbins et al.

(10) Patent No.: US 9,441,725 B2
(45) Date of Patent: Sep. 13, 2016

(54) TRANSMISSION FLUID WARM-UP SYSTEM AND METHOD

(71) Applicant: FORD GLOBAL TECHNOLOGIES, LLC, Dearborn, MI (US)

(72) Inventors: Brandon Dobbins, Grosse Pointe Shores, MI (US); Shailesh Shrikant Kozarekar, Novi, MI (US); Kevin Layden, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 174 days.

(21) Appl. No.: 14/558,135

(22) Filed: Dec. 2, 2014

(65) Prior Publication Data

US 2016/0153544 A1    Jun. 2, 2016

(51) Int. Cl.
  *F16H 57/04*    (2010.01)
  *B60W 20/00*    (2016.01)

(52) U.S. Cl.
  CPC .......... *F16H 57/0413* (2013.01); *B60W 20/00* (2013.01); *F16H 57/042* (2013.01); *F16H 57/0457* (2013.01)

(58) Field of Classification Search
  CPC ........... F16H 57/0413; F16H 57/0457; F16H 57/042; F16H 57/04; B60W 20/00
  See application file for complete search history.

(56) References Cited

U.S. PATENT DOCUMENTS

| | | | |
|---|---|---|---|
| 7,004,273 B1 * | 2/2006 | Gruenwald | B60K 6/46 180/65.245 |
| 7,234,552 B2 | 6/2007 | Prema et al. | |
| 7,252,165 B1 * | 8/2007 | Gruenwald | B60L 1/003 180/65.25 |
| 9,043,062 B2 * | 5/2015 | Miller | B60L 15/00 701/22 |
| 2003/0183467 A1 * | 10/2003 | Kozarekar | B60K 6/22 188/380 |
| 2004/0112654 A1 * | 6/2004 | Kozarekar | B60K 6/22 180/65.235 |
| 2004/0226761 A1 * | 11/2004 | Takenaka | B60K 6/365 180/65.1 |
| 2005/0196662 A1 * | 9/2005 | Prema | B60K 6/48 429/50 |
| 2007/0032926 A1 * | 2/2007 | Kozarekar | B60K 6/445 701/22 |
| 2007/0233334 A1 * | 10/2007 | Kozarekar | B60K 6/445 701/22 |
| 2010/0175933 A1 * | 7/2010 | Yoshida | B60K 6/26 180/65.1 |
| 2014/0132378 A1 * | 5/2014 | Vafakhah | H01F 27/12 336/55 |
| 2014/0132379 A1 | 5/2014 | Vafakhah et al. | |
| 2014/0132382 A1 | 5/2014 | Zarei et al. | |

\* cited by examiner

*Primary Examiner* — David J Hlavka
(74) *Attorney, Agent, or Firm* — David B. Kelley; Brooks Kushman P.C.

(57) ABSTRACT

A vehicle includes a transmission having gears lubricated by oil and a variable voltage converter (VVC). The VVC includes an inductor arranged such that the oil contacts the inductor. The vehicle also includes at least one controller configured to operate the VVC to output a desired power. The controller, in response to a temperature of the oil being less than a threshold, alters a voltage and current of the VVC while maintaining the desired power to increase heat output by the inductor.

20 Claims, 9 Drawing Sheets

DUTY CYCLE
(P = 20 Kwatts)

|   | $V_{dc}$ (volts) | CURRENT (amps) |
|---|---|---|
| A | 200 | 100 |
| B | 300 | 66.67 |
| C | 400 | 50 |

TRANSMISSION FLUID WARM-UP SYSTEM AND METHOD

TECHNICAL FIELD

The present disclosure relates to a system and method for heating transmission fluid and more specifically to heating the transmission fluid with a power inductor.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

Electric vehicles include a voltage converter (DC-DC converter) connected between the battery and the electric machine. Electric vehicles that have AC electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor) assembly, switches and diodes. A typical inductor assembly includes a conductive coil that is wound around a magnetic core. The inductor assembly generates heat as current flows through the coil.

Electric vehicles further include a transmission or transaxle. The transmission includes transmission fluid, such as oil, for lubricating gears and preforming other transmission functions. The transmission performs more efficiently when operating within a desired temperature range. Vehicle fuel efficiency is improved by decreasing the time taken for the transmission to reach the desired temperature range.

SUMMARY

According to one embodiment, a vehicle includes a transmission having gears lubricated by oil. A variable voltage converter (VVC) includes an inductor arranged such that the oil contacts the inductor. The vehicle also includes at least one controller configured to operate the VVC to output a desired power. The controller, in response to a temperature of the oil being less than a threshold, alters a voltage and current of the VVC while maintaining the desired power to increase heat output by the inductor.

According to another embodiment, a vehicle includes a transmission having gears lubricated by oil and a traction battery. A variable voltage converter (VVC) is electrically connected to the battery and includes an inductor arranged such that the oil contacts the inductor. The vehicle also includes at least one controller configured to receive a signal indicative of an oil temperature, and reverse a polarity of a battery current if the oil temperature is below a threshold value to increase heat output by the inductor.

According to yet another embodiment, a method is disclosed for heating a transmission of a hybrid vehicle. The vehicle includes a variable voltage converter (VVC) having an inductor in contact with transmission oil. The method includes operating the VVC to output a desired power, and in response to a temperature of the oil being less than a threshold, alter a voltage and current of the VVC while maintaining the desired power to increase heat output by the inductor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
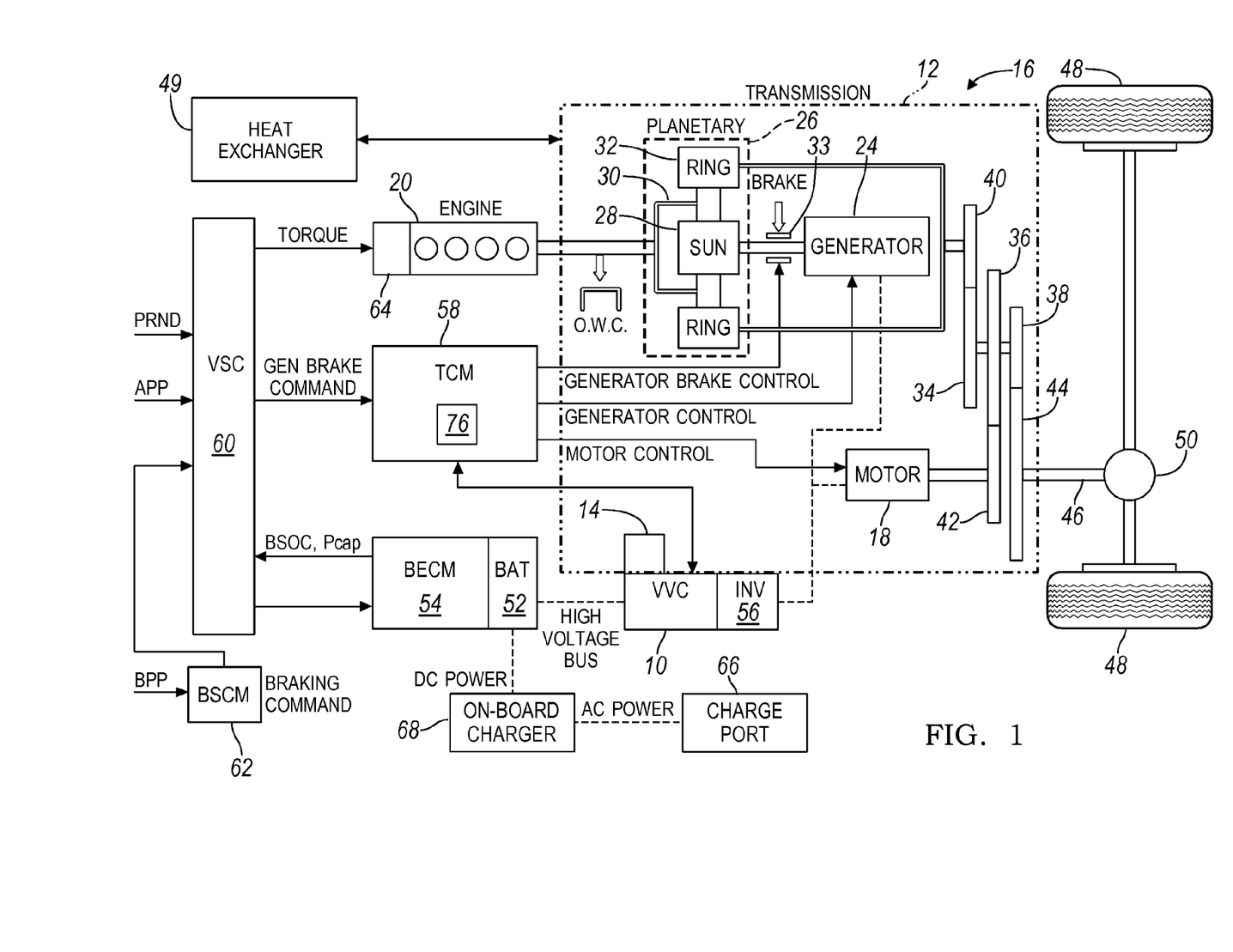
FIG. 1 is a schematic diagram of a vehicle.

Referring to FIG. 1, a transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 may be an AC electric motor depicted as "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 may have a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48. The transmission also includes a heat exchanger or automatic transmission fluid cooler 49 for cooling the transmission fluid.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{ap}$) that is indicative of a battery state of charge (BSOC) and a battery power capability to other vehicle systems and controllers.

The transmission 12 includes a DC-DC converter or variable voltage converter (VVC) 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 may provide a regenerative braking command to the VSC 60.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 may be configured as a plug-in hybrid electric vehicle (PHEV). The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the VVC 10 may be implemented on other types of electric vehicles, such as a HEV or a BEV.

Figure 2:
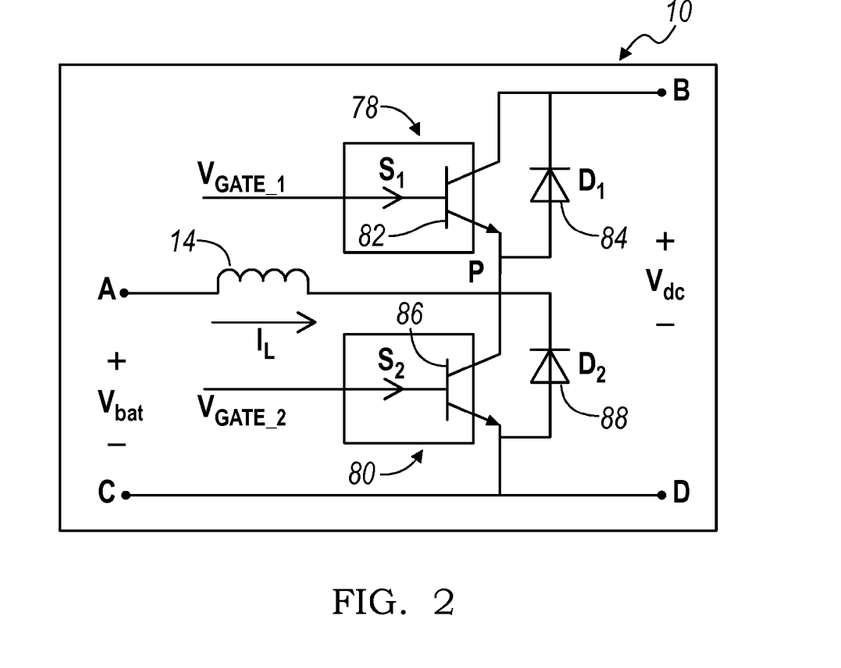
FIG. 2 is a circuit diagram of the variable voltage converter (VVC) of FIG. 1.

With reference to FIG. 2, the VVC 10 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. The inductor assembly 14 is depicted as an input inductor that is connected in series between the traction battery 52 and the switching units 78, 80. The inductor 14 generates magnetic flux when a current is supplied. When the current flowing through the inductor 14 changes, a time-varying magnetic field is created, and a voltage is induced. The inductor 14 creates heat when current passes through the inductor. Other embodiments of the VVC 10 include different circuit configurations (e.g., more than two switches).

In response to a driver torque request, the VSC 60 determines the amount of power needed to be supplied from the traction battery 52 to the electric machines in order to meet the torque request. The power is equal to $V_{dc}$ x current. The system circuitry can modify $V_{dc}$ and current to provide a same power more efficiently. For example, $V_{dc}$ can be reduced and current can be increased. If the $V_{dc}$ is equal to $V_{bat}$ then voltage in not induced and less heat losses are incurred. This operation is known as bypass mode and occurs when $V_{dc}$ is equal to $V_{bat}$. Bypass mode may be ideal during light torque requests (such as steady speed driving and light acceleration) but is not ideal during a high torque request. During high torque requests, the $V_{dc}$ required to supply sufficient power is greater than $V_{bat}$. The switches 78, 80 operate the inductor 14 to boost $V_{bat}$ to the required $V_{dc}$. During normal diving cycles the system regularly switches in and out of bypass mode causing the inductor to generate waste heat. The waste heat can be used to warm the transmission oil.

Figure 3:
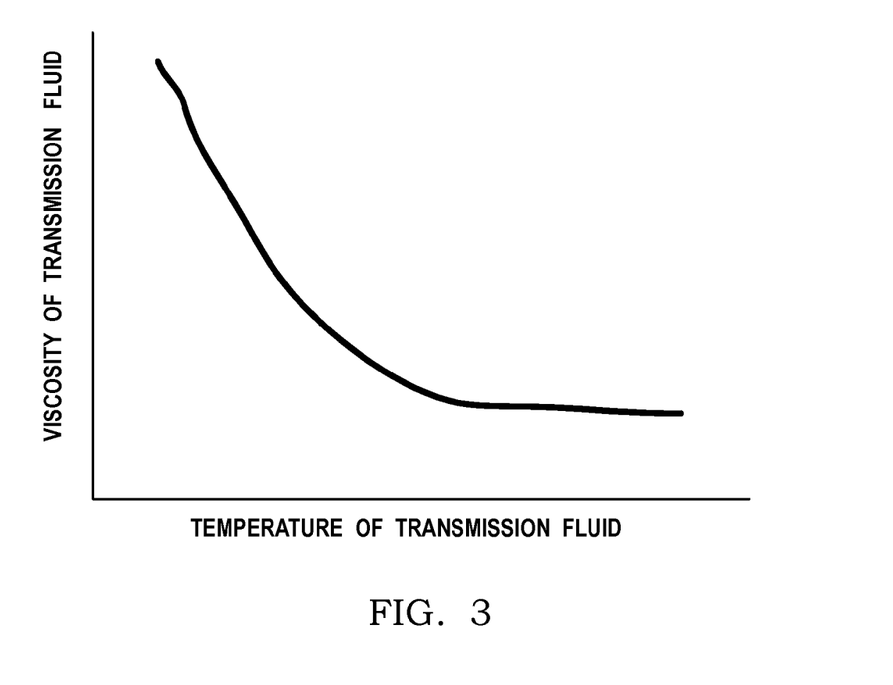
FIG. 3 is a plot showing the viscosity of transmission oil versus temperature.

One reason for reduced transmission efficiency is increased friction losses due to the transmission oil 96. The friction losses are a function of the viscosity of the oil. The more viscous the oil, the greater the friction losses. The viscosity of the oil is a function of temperature. Generally speaking, colder oil is more viscous than warmer oil. Referring to FIG. 3, a hypothetical chart shows transmission oil viscosity over a range of oil temperatures. The viscosity of the oil decreases with increased temperature until the oil reaches a threshold temperature. After the threshold temperature, the oil viscosity remains substantially constant over a range of increased temperatures. The chart can be partitioned into two zones, a warm-up zone wherein the viscosity varies according to oil temperature and an operating zone wherein the viscosity is substantially constant. In order to increase fuel efficiency of the vehicle, it is ideal to transition from the warm-up zone to the operating zone as quickly as possible. The transmission generates heat and will warm-up on its own, however the transmission warm-up time can be reduced by adding external heat to the transmission fluid. The waste heat generated by the inductor 14 can be added to the transmission oil to decrease transmission warm-up time and improve vehicle fuel economy.

Figure 4:
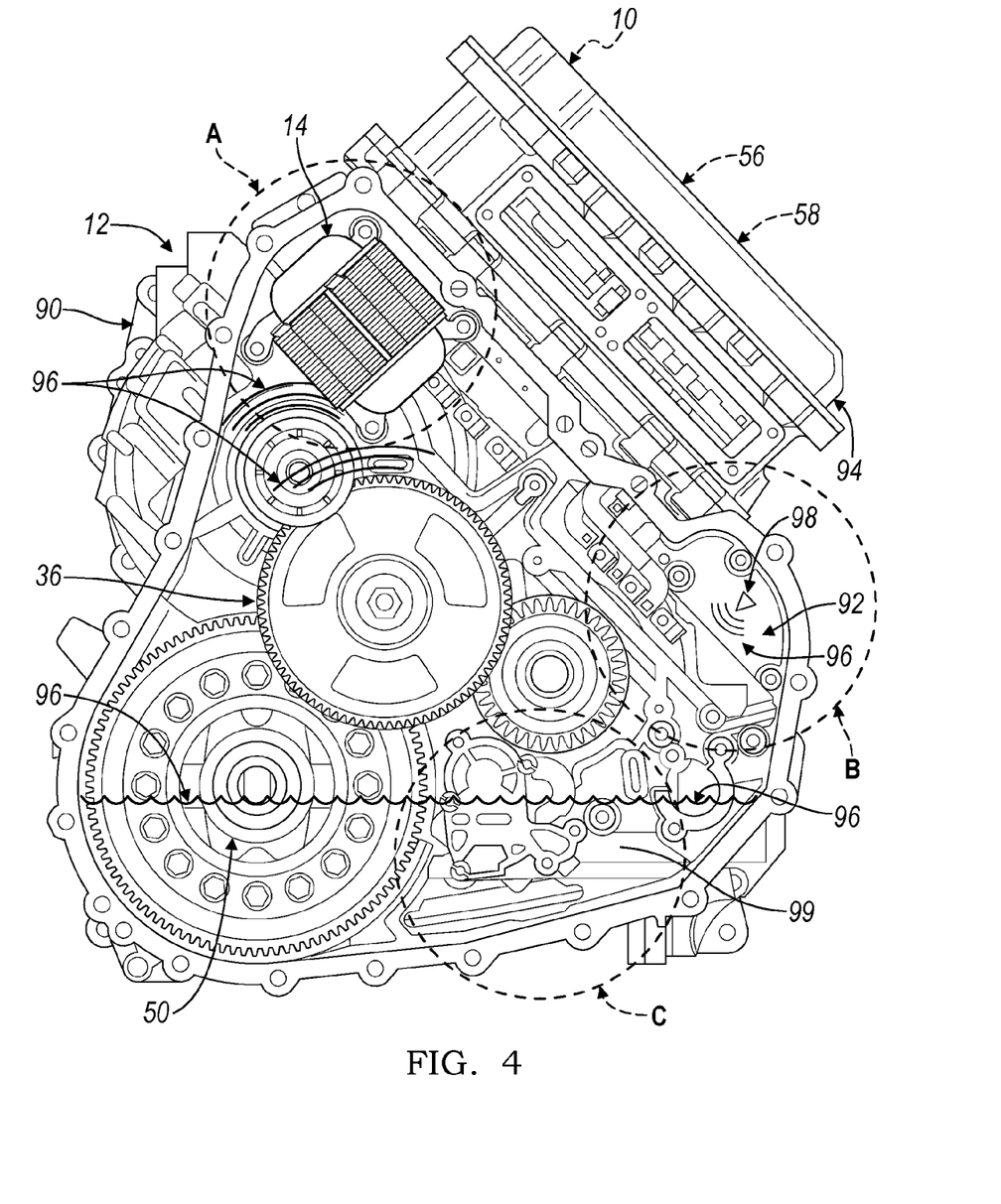
FIG. 4 is a front view of a transmission and a VVC having an inductor assembly, and illustrating structure for supporting the inductor assembly within the transmission.

Referring to FIG. 4, a front view of the transmission 12 and the VVC 10 is shown. The transmission 12 includes a transmission housing 90, which is illustrated without a cover to show internal components. As described above, the engine 20, the motor 18 and the generator 24 include output gears that mesh with corresponding gears of the planetary gear unit 26. These mechanical connections occur within an internal chamber 92 of the transmission housing 90. The transmission 12 includes a transmission fluid 96, such as oil, for lubricating and cooling the gears located within the transmission chamber 92 (e.g., the intermediate gears 34, 36, 38). The transmission chamber 92 is sealed to retain the fluid 96. The transmission 12 may also include valves, pumps and conduits (not shown) for circulating the fluid 96 through the chamber 92. A heat exchanger or cooler 49 may be used to cool the fluid 96.

A power electronics housing 94 is mounted to an external surface of the transmission 12. The inverter 56 and the TCM 58 are mounted within the power electronics housing 94. The VVC 10 is an assembly with components that may be mounted both inside and/or outside of a transmission 12. The VVC 10 includes an inductor assembly 14. In this embodiment, the inductor assembly 14 is located within the transmission housing 90 so that heat is transferred from the inductor 14 to the transmission 12. The VVC 10 also includes a number of switches and diodes (shown in FIG. 2) that are mounted in the power electronics housing 94, which is outside of the transmission 12, and are operably coupled to the inductor assembly 14. By mounting the inductor assembly 14 within the transmission 12, the exposed surface area of the inductor assembly 14 is in direct contact with the transmission fluid 96. The transmission 12 includes additional structure for supporting the inductor assembly 14 while allowing the transmission fluid 96 to flow through the structure to contact the exposed surface area.

Rotating elements (e.g., gears and shafts) may displace or "splash" fluid 96 on other components. Such a "splash" region is referenced by letter "A" and is located in an upper portion of the chamber 92. If the inductor assembly 14 is disposed in region A, the inductor assembly 14 heats transmission fluid 96 that splashes off of the rotating elements (e.g., the second intermediate gear 36 and the differential 50) as they rotate.

The transmission 12 may include nozzles 98 for directly spraying transmission fluid 96 on components within the housing 90. Such a "spray" region is referenced by letter "B" and is located in an intermediate portion of the chamber 92. The inductor assembly 14 may be mounted within region B such that transmission fluid 96 is sprayed onto the inductor assembly 14 by the nozzle 98. The sprayed transmission fluid 96 is heated by the inductor assembly 14 as it contacts the inductor. The inductor assembly 14 may also receive transmission fluid 96 that splashes off of proximate rotating elements (e.g., the planetary gear unit 26). Other embodiments of the transmission 12 contemplate multiple nozzles and nozzles mounted in other locations of the chamber 92 (e.g., a nozzle mounted in region A).

Further, the transmission fluid 96 accumulates within a lower portion, also known as a reservoir or sump 99 of the chamber 92. Such an "immersion" region is referenced by letter "C" and is located in a lower portion 99 of the chamber 92. The inductor assembly 14 may be mounted within region C and immersed in the transmission fluid 96. The inductor assembly 14 heats the transmission fluid 96.

Figure 5:
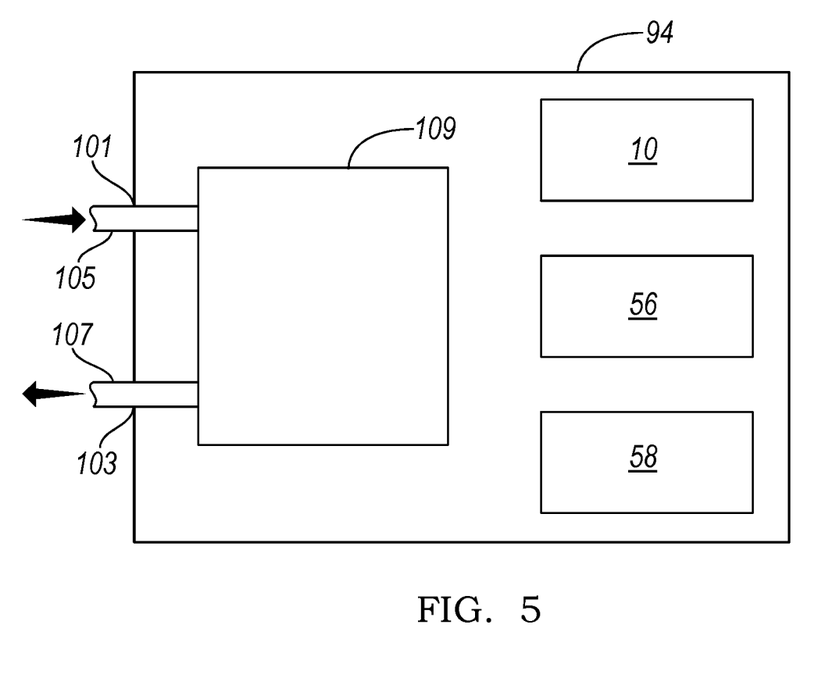
FIG. 5 is a schematic diagram of a power electronics housing.

Referring to FIG. 5, a power electronics housing 94 is shown in an alternative embodiment. In this embodiment, the VVC 10, the inverter 56, the TCM 58, and the inductor assembly 109 are all disposed within the housing 94. The housing 94 includes a first aperture 101 and a second aperture 103. An inlet fluid line 105 is received through the first aperture 101 and provides fluid to the inductor assembly 109. An outlet fluid line 107 is received through the second aperture 103 and provides a return for the fluid. The fluid is circulated through the inductor assembly 109 to absorb heat from the inductor assembly 108 causing the fluid to warm. The inductor assembly 108 is sealed to prevent fluid from damaging the other electrical components inside the housing 94. The inlet and outlet fluid lines 105, 107 are connected with the transmission plumbing.

Figure 6:
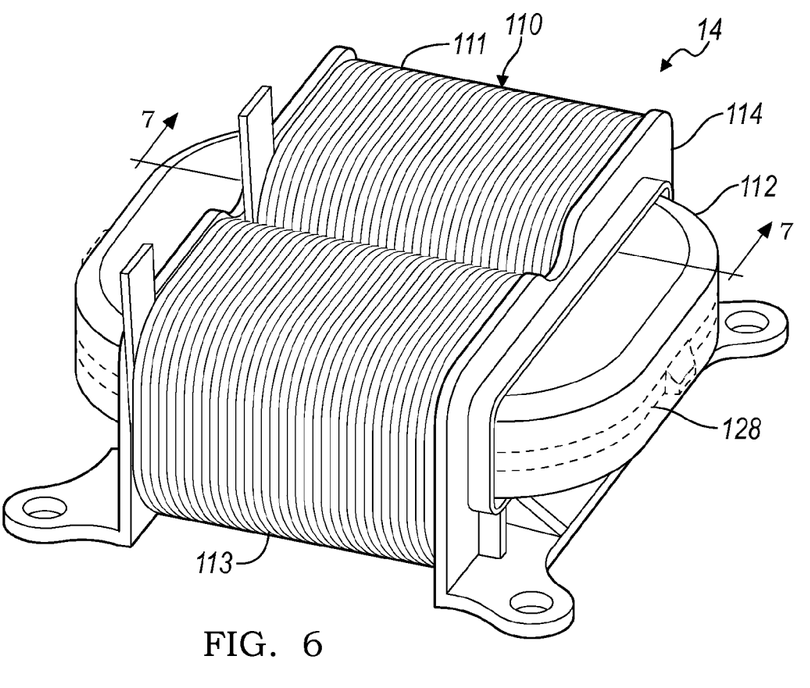
FIG. 6 is an enlarged front perspective view of an inductor assembly including support structure according to one or more embodiments.
Figure 7:
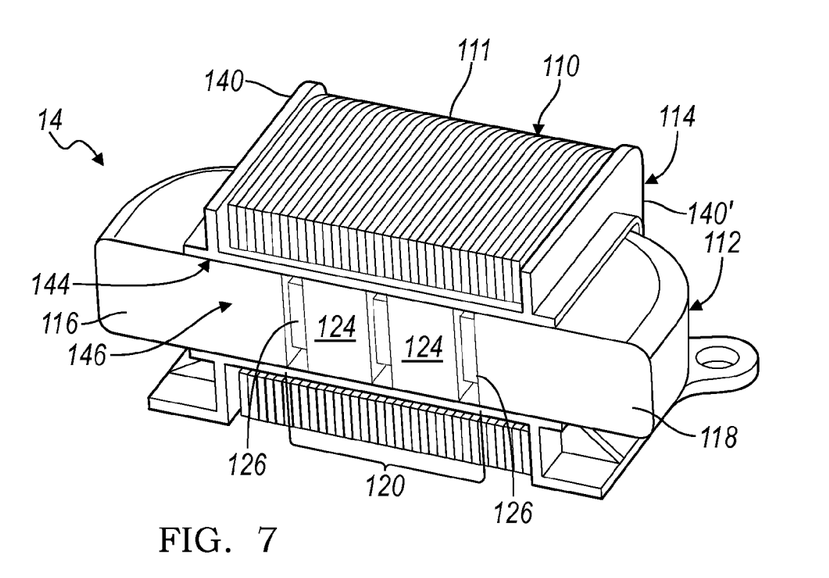
FIG. 7 is a section view of the inductor assembly of FIG. 6 taken along section line 7-7.
Figure 8:
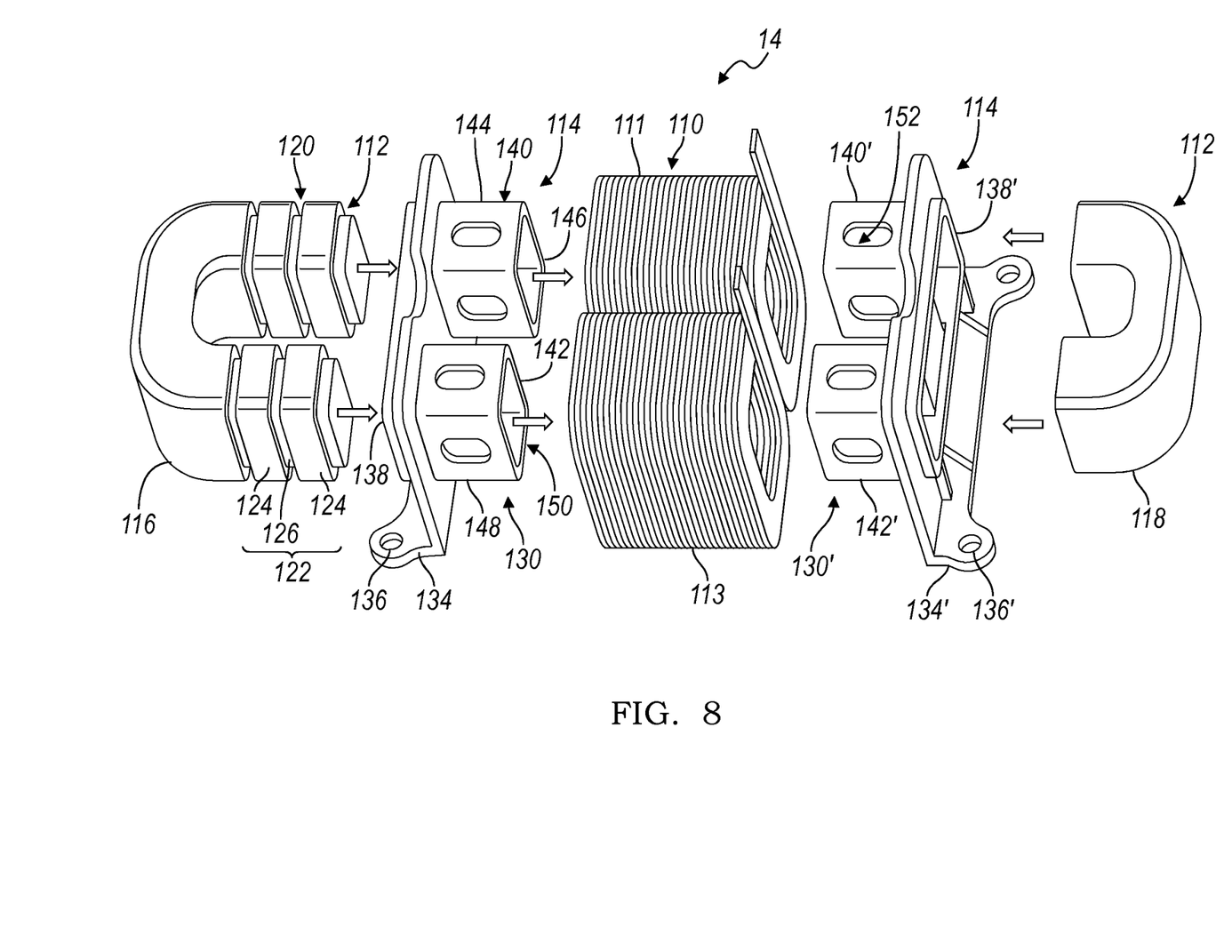
FIG. 8 is an exploded view of the inductor assembly of FIG. 6.

FIGS. 6 to 8 illustrate the inductor assembly 14 according to one or more embodiments. The inductor assembly may be placed in various locations on the vehicle such as within the transmission housing 90. The inductor assembly 14 includes a conductor 110 that is formed into two adjacent tubular coils, a core 112 and an insulator 114. The inductor assembly 14 includes the insulator 114, which is formed as a two-piece bracket and supports the conductor 110 and the core 112. Additionally, the insulator 114 physically separates the conductor 110 from the core 112 and is formed of an electrically insulating polymeric material, such as Polyphenylene sulfide (PPS).

The conductor 110 is formed of a conductive material, such as copper or aluminum, and wound into two adjacent helical coils, a first coil 111 and a second coil 113. The coils may be formed using a rectangular (or flat) type conductive wire by an edgewise process. Input and output leads extend from the conductor 110 and connect to other components.

The core 112 may be formed in a dual "C" configuration. The core 112 includes a first end 116 and a second end 118 that are each formed in a curved shape. The core 112 also includes a first leg 120 and a second leg 122 for interconnecting the first end 116 to the second end 118 to collectively form a ring shaped core 112. Each leg 120, 122 includes a plurality of core elements 124 that are spaced apart to define air gaps. The core 112 may be formed of a magnetic material, such as an iron silicon alloy powder. Ceramic spacers 126 may be placed between the core elements 124 to maintain the air gaps. An adhesive may be applied to the core 112 to maintain the position of the ends 116, 118 and the legs 120, 122 including the core elements 124 and the spacers 126. Alternatively, a strap 128, as shown in phantom view in FIG. 8, may be secured about an outer circumference of the core 112 to maintain the position of the ends 116, 118 and legs 120, 122.

The insulator 114 may be formed as a bobbin structure with a first half portion 130 and a second half portion 130' that are generally symmetrical to each other. Each half portion 130, 130' includes a base 134, 134' for attachment of the assembly 14. The base 134, 134' includes apertures 136, 136' for receiving fasteners (not shown) for mounting the inductor assembly 14 to a supporting structure such as a transmission or other housing. A support 138, 138' extends transversely from the base 134, 134'. A pair of spools, including a first spool 140, and a second spool 142, extend from the support 138 of the first half portion 130, to engage a corresponding first spool 140' and a corresponding second spool 142' that extend from the support 138' of the second half portion 130'. In one embodiment, the first spools 140, 140' are coaxially aligned along a first longitudinal axis (not shown), and the second spools 142, 142' are coaxially aligned along a second longitudinal axis (not shown) that is parallel to the first longitudinal axis. The spools 140, 140', 142, 142' are each formed in a tubular shape with a generally square shaped cross section.

The insulator 114 supports the conductor 110 and the core 112. The first spools 140, 140' engage each other to collectively provide an external surface 144 for supporting the first coil 111. The first spools 140, 140' also define a cavity 146 for receiving the first leg 120 of the core 112. Similarly, the second spools 142, 142' engage each other to collectively provide an external surface 148 for supporting the second coil 113, and define a cavity 150 for receiving the second leg 122 of the core 112. According to the illustrated embodiment, the spools 140, 140', 142, 142' include a plurality of holes 152 for facilitating heat transfer from the legs 120, 122 by allowing the fluid 96 to easily pass through the spools 140, 140', 142, 142'. Other embodiments of the insulator 114 include nonsymmetrical half portions (not shown). For example, the spools may extend from one of the half portions and are received by the support of the other half portion (not shown).

Figure 9:
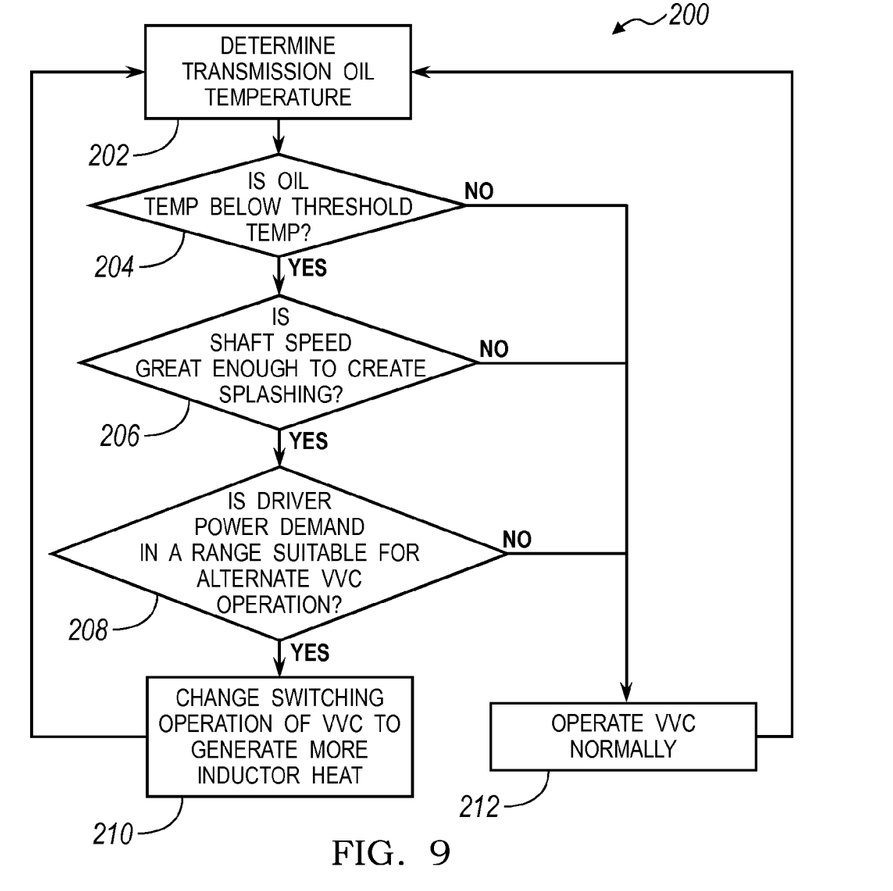
FIG. 9 is a flow chart for increasing the temperature of the transmission oil according to one embodiment.

The VSC 60 can operate the VCC 10 in a less efficient mode creating more heat from the inductor 14 to increase the heating rate of the transmission oil. This mode may be referred to as a heat generating mode. Referring to FIG. 9, a control logic 200 is illustrated for operating the VVC 10 in a heat generating mode to accelerate heating of the transmission fluid. The control logic 200 is implemented using software code contained within one or more of the controllers such as the VSC 60, TCM 58, and/or ECM 64. At operation 202 the controller determines the temperature of the transmission oil. The transmission oil temperature may be determined directly with a sensor or may be inferred using other measurements and data.

At operation 204 the transmission oil temperature is compared to a threshold transmission oil temperature value to determine if the transmission oil temperature is less than the threshold temperature. If the transmission oil temperature is greater than the threshold temperature, control passes to operation 212 and the VVC 10 is operated normally because the transmission will not benefit from additional heating. If the transmission oil is below the threshold temperature, the controller determines if the shaft speed of the gears within the transmission is fast enough to create splashing at operation 206. If shaft speed is too slow, control passes to operation 212. If shaft speed is sufficient, control passes to operation 208. In some embodiments, operation 206 may be omitted.

The VVC 10 can operate in heat generation mode when the driver power request is within a threshold range. If the power request is outside of the threshold range, heat generation mode is not possible. For example, if the driver torque request is large, then the VVC 10 is operated normally in order to deliver the driver requested torque. In operation 208, the controller determines if the current power request is within the threshold range. If not, control passes to operation 212. If so, control passes to operation 210.

In operation 210 the switching operation of the VVC 10 is modified to generate more heat from the inductor 14. In normal operation, the controller selects a $V_{dc}$ value as close to $V_{bat}$ as is possible for any given driver power request. If transmission heating is desirable, the controller can modify the switching operation to increase $V_{dc}$ to generate more heat in the inductor 14.

Figure 10:
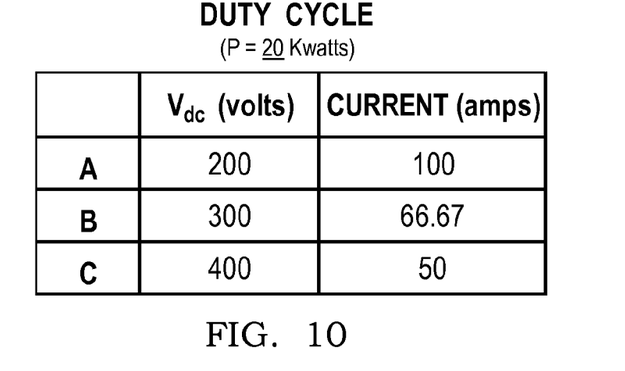
FIG. 10 is table showing voltage and current outputs of the VVC and associated circuitry for different operating modes.

FIG. 10 displays possible $V_{dc}$ and current values that may be used to satisfy a driver power request of 20 kilowatts. In this example $V_{bat}$ is 200 volts. $V_{dc}$ and current values can be modified by changing the operating speed of the switches. The switching speed may be increased to create more current through the inductor and thus generate more heat with the inductor.

Alternative A shows an efficient operating condition that generates less heat in the inductor. In alternative A, $V_{dc}$ is equal to $V_{bat}$, and the VVC 10 is operating in bypass mode. If it is desirable to heat the transmission oil, operation of the VVC 10 can be modified to create more heat in the inductor. In alternative C, the switching speed is increased to send more current through the inductor 14. Alternative C is a less efficient operating condition and produces more heat within the inductor 14. In alternative C, the same 20 kilowatts of power are supplied, but $V_{dc}$ is 400 volts and the current is 50 amps. The $V_{bat}$ has been boosted by 200 volts to provide a $V_{dc}$ of 400 volts. The inductor 14 is utilized to boost the voltage, which generates heat.

Figure 11:
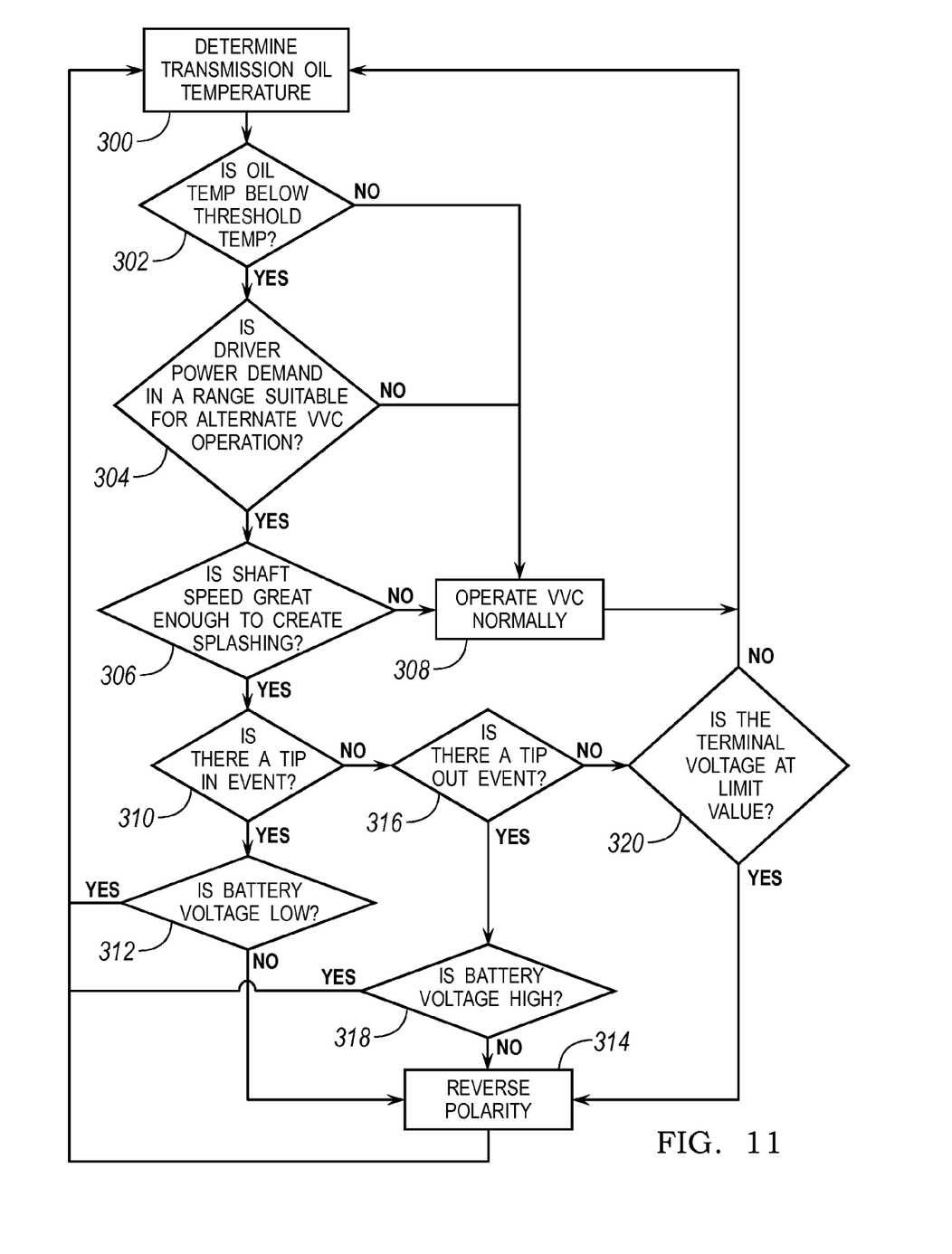
FIG. 11 is a flow chart for increasing the temperature of the transmission oil according to another embodiment.
Figure 12:
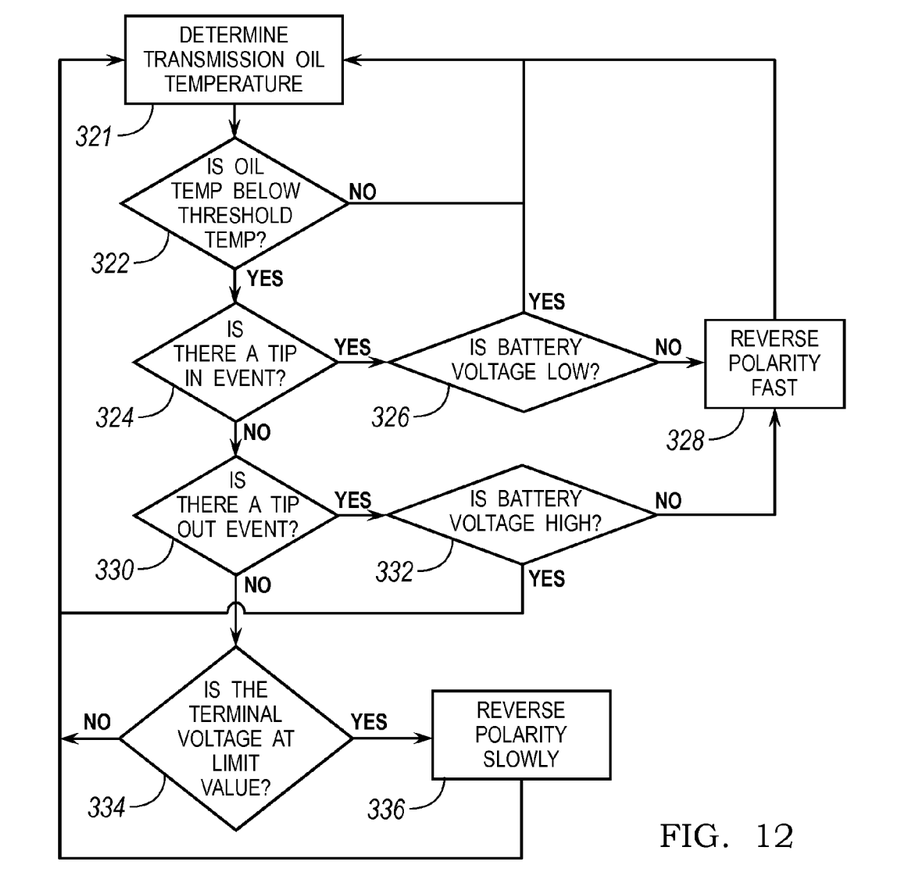
FIG. 12 is a flow chart for increasing the temperature of the transmission oil according to yet another embodiment.
Figure 13:
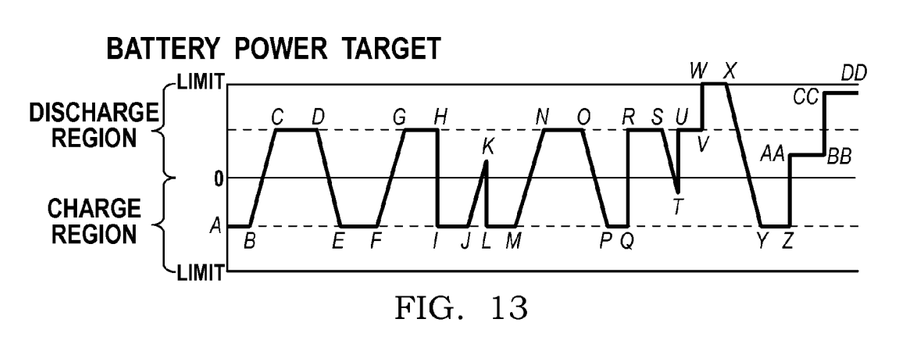
FIG. 13 is a plot showing the operation of the inductor during a hypothetical drive cycle of the vehicle.

FIGS. 11 through 13 illustrate another method for increasing heat output of the inductor 14 in order to heat the transmission oil. In this method, the battery cells are cycled to increase heat output of the inductor 14. Referring to FIG. 11, at operation 300 the flow chart begins by determining the temperature of the transmission oil. The transmission oil may be measured with a transmission temperature sensor or may be inferred through other measurements. At operation 302 the controller determines if the transmission oil is cold. The oil is cold if the battery temperature is below a threshold temperature value. The threshold temperature value may be a predetermined constant based on transmission specifications that is programmed into the memory of the controller. If the oil temperature is below the threshold temperature value additional heating is desired in order to improve vehicle performance. If the oil temperature is not below the threshold value, additional efforts to increase oil temperature are unnecessary.

At operation 304 the controller determines if driver power demand is in a range suitable for alternative VVC operation. For example, if driver torque request is high, the VVC 10 is operated normally in order to supply the vehicle drivetrain with the necessary power to meet the driver demand. If the driver torque demand is in a range suitable for alternative VVC operation, the controller determines if shaft speed is high enough to create splashing at operation 306. If shaft speed is too low to create splashing, then control passed to operation 308 and the VVC 10 is operated normally. Operation 306 is omitted in some embodiments. For example, operation 306 is omitted if the inductor 14 is directly sprayed by oil.

If shaft speed is high enough control passes to operation 310. At operation 310 the controller determines whether a "tip-in" event has occurred. A tip-in event indicates that additional power or vehicle acceleration is demanded by the driver. A tip-in event may be indicated by detecting that the gas pedal has been pressed quickly. If a tip-in event has occurred, the battery voltage is assessed at 312 to determine whether sufficient battery voltage is available to provide the additional power demanded. If the battery voltage is low, additional power is not provided and the process returns to operation 300. If the battery voltage is not low, then the polarity of the battery current (here, polarity refers to charging or discharging) is reversed at operation 314, thereby reducing the polarization resistance voltage and heating the inductor.

Similarly, at 316, the controller determines whether a "tip-out" event has occurred. A tip-out event indicates that less power or vehicle deceleration is demanded by the driver. A tip-out event may be indicated by braking the vehicle, lifting off the gas pedal, or a combination of braking and/or lifting off the gas pedal. If a tip-out event has occurred, the battery voltage is assessed at 318 to determine whether the battery may be charged with energy recovered by a regenerative braking or other energy recovery system. If the voltage is high, then additional energy cannot be stored by the battery and the process returns to operation 300. If the battery voltage is not too high, then the polarity of the battery is reversed at operation 314, thereby increasing the rate of inductor heating.

Continuing at 320, if there are no tip-in or tip-out events, the controller assesses whether the terminal voltage of the battery has reached a limit value. The limit value is based on the polarization resistance voltage. If the terminal voltage is at the limit value, then the polarity of the battery is reversed at operation 314 to temporarily nullify the polarization resistance voltage and increase the rate of inductor heating. If the terminal voltage is not at the limit value, then the process returns to operation 300.

Referring to FIG. 12, a flowchart of an alternate embodiment is shown. At operation 321 the flow chart begins by determining the temperature of the transmission oil. At operation 322 the controller determines if the transmission oil is cold. The oil is cold if the battery temperature is below a threshold temperature value. If the oil temperature is below the threshold temperature value, additional heating is desired in order to improve vehicle efficiency. If the oil temperature is not below the threshold value, additional efforts to increase oil temperature are unnecessary and the VVC 10 is operated normally.

At operation 324 the controller determines if a tip-in event has occurred. If a tip-in event occurs at 324 and the battery voltage is not low at 326, then the polarity of the battery is reversed quickly or at a high slew rate at 328. Likewise, if a tip-out event occurs at 330 and the battery voltage is not too high at 332, then the polarity is also reversed quickly at 328. However, at 334, if the terminal voltage is at the limit value, then the polarity is reversed at a slow slew rate at operation 336. Optionally, additional polarity reversal slew rates may be employed. For example, a first slew rate may be used for a tip-in event, a second slew rate may be used for a tip-out event, and a third slew rate may be used for a terminal voltage event. Alternatively, any combination of equal or unequal slew rates could be used for each type of event.

A high slew rate generates more heat in the inductor than a lower slew rate but is more detectable by the driver. But, during a tip-in or a tip-out event, higher ambient noise levels mask noise due to the polarity reversal process allowing for higher slew rates. The driver may also expect the engine to rev up or down during a tip-in or tip-out event. For instance, when a tip-in event occurs, more energy is demanded from the battery and the internal combustion engine, which causes the engine to work harder and increases the noise level inside the vehicle. When a polarity reversal is not expected or initiated by the driver, a slower slew rate may be used. For example, a slow slew rate is used when a terminal voltage limit is reached since the increased ambient noise levels that accompany engine acceleration or deceleration are not present. The slow slew rate reduces the perceptibility of any change in engine speed or noise that may result from the terminal voltage limit polarity reversal. Consequently, having multiple slew rates helps address occupant sensitivities to noise.

Referring to FIG. 13, a plot of how the flow charts of FIGS. 11 and 12 relate to the power demands on the battery is shown. In the plot, the horizontal axis represents time and the vertical axis represents the battery power target level. The battery is discharging in the region above the zero power line and is charging in the region below the zero power line. The horizontal lines labeled "limit" denote the physical charge and discharge limits of the battery.

Starting at point A and moving from left to right, the battery is charging between points A and B. At point B, the terminal voltage reaches the polarization resistance voltage limit value and the battery cannot take additional charge without first reversing the battery polarity. The battery current is reversed at a slow slew rate from points B and C. The polarity reverses when the zero line separating the charge and discharge regions is crossed.

From point C to D, the battery is discharging. At point D, the polarization resistance voltage limit of the battery is reached and the polarity must again be reversed. The battery current polarity is reversed at a slow slew rate from points D to E.

From point E to point F, the battery is charging. At point F, the polarization resistance voltage limit is reached. The battery current polarity is reversed at a slow slew rate from point F to point G. The battery discharges between points G and H. At point H, a tip-out event occurs. The battery current polarity is reversed at a fast slew rate between points H and I.

From point I to point J, the battery is charging. At point J, the polarization resistance voltage limit is reached. While the polarity is being reversed between points J and K, another tip-out event occurs. At point K the battery current has already changed direction (i.e., point K is on the opposite side of the zero line from point J), which means the polarity resistance voltage has been overcome. Consequently, a polarity reversal back to the charge region is permitted.

From point L to point M, the battery is charging. At point M, the polarization resistance voltage limit is reached and the polarity is reversed from point M to point N. The battery is discharging from point N to point O. At point O, the polarization voltage limit is reached and the battery current polarity is reversed at a slow slew rate between points O and P.

From point P to point Q, the battery is charging. At point Q, a tip-in event occurs. The battery current polarity is reversed at a high slew rate from point Q to point R.

From point R to point S, the battery is discharging. At point S, the polarization resistance voltage is met. From point S to point T, the polarity is reversed. While the polarity is being reversed, a tip-in event occurs at point T. Since point T has a different polarity than point S, a polarity reversal to discharge is allowed and the polarity is reversed at a high slew rate to point U.

From point U to point V, the battery is discharging. At point V, another tip-in event occurs. A new discharge power target is calculated and established at point W. From point W to point X, the battery continues to discharge. At point X, the polarization voltage limit is reached and the polarity is reversed at a slow slew rate to point Y.

From point Y to Z, the battery is charging. At point Z, a tip-in event occurs. A new discharge power target level AA is calculated and established at a high slew rate. From point AA to point BB, the battery is discharging. At point BB, another tip-in event occurs. A new discharge power target CC is calculated and established at a high slew rate. The process of reversing polarity and establishing power target levels continues based on changes in battery status and driver inputs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a transmission including gears lubricated by oil;
   a variable voltage converter (VVC) including an inductor arranged such that the oil contacts the inductor; and
   at least one controller configured to operate the VVC to output a desired power, and in response to a temperature of the oil being less than a threshold, alter a voltage and current of the VVC while maintaining the desired power to increase heat output by the inductor.

2. The vehicle of claim 1 wherein the transmission further includes a housing and wherein the inductor is mounted within the housing.

3. The vehicle of claim 2 wherein the transmission further includes nozzles for spraying the oil directly on the inductor.

4. The vehicle of claim 1 further comprising:
a power electronics housing attached to the transmission, wherein the inductor is mounted within the power electronics housing; and
fluid lines connected to the inductor and configured to circulate oil between the inductor and the transmission.

5. The vehicle of claim 1 wherein, in response to a temperature of the oil being less than a threshold, the controller is further configured to increase the voltage and proportionally decrease the current while maintaining the desired power to increase heat output by the inductor.

6. The vehicle of claim 1 further comprising a transmission shaft coupled to at least one of the gears, and wherein the controller is further configured to receive a signal indicating a speed of the shaft and in response to the speed being greater than a threshold speed, operate the VVC to increase heat output by the inductor.

7. The vehicle of claim 1 wherein the controller is further configured to receive a signal indicating a driver torque request and in response, operate the VVC to increase heat output by the inductor if the driver torque request is below a threshold value.

8. A vehicle comprising:
a transmission including gears lubricated by oil;
a battery;
a variable voltage converter electrically connected to the battery and including an inductor arranged to contact the oil; and
at least one controller configured to receive a signal indicative of an oil temperature, and reverse a polarity of a battery current if the oil temperature is below a threshold value to increase heat output by the inductor to heat the oil.

9. The vehicle of claim 8 wherein the controller is further configured to reverse the polarity of the battery current if the oil temperature is below the threshold value and a tip-in event, tip-out event or a terminal voltage event has occurred.

10. The vehicle of claim 8 wherein the controller is further configured to reverse the polarity of the battery current if the oil temperature is below the threshold value and a tip-in event or a tip-out event has occurred.

11. The vehicle of claim 10 wherein the controller is further configured to reverse the polarity of the battery at a first slew rate for the tip-in event and at a second slew rate for the tip-out event.

12. The vehicle of claim 11 wherein the first slew rate is greater than the second slew rate.

13. The vehicle of claim 8 wherein the inductor is mounted within the transmission.

14. The vehicle of claim 13 wherein the transmission further includes nozzles for spraying the oil directly on the inductor.

15. A method for heating a transmission of a hybrid vehicle, the vehicle including a variable voltage converter (VVC) having an inductor in contact with transmission oil, the method comprising:
operating the VVC to output a desired power, and in response to a temperature of the oil being less than a threshold, alter a voltage and current of the VVC while maintaining the desired power to increase heat output by the inductor.

16. The method of claim 15 wherein the inductor is mounted within the transmission.

17. The method of claim 16 further comprising splashing the oil onto the inductor by rotating gears within the transmission.

18. The method of claim 16 further comprising spraying oil directly on the inductor with a nozzle.

19. The method of claim 15 further comprising increasing the voltage and proportionally decreasing the current while maintaining the desired power to increase heat output by the inductor if the temperature of the oil is less than the threshold.

20. The method of claim 15 further comprising receiving a signal indicative of a transmission shaft speed and wherein the operating is commenced in response to the shaft speed being above a threshold speed.

* * * * *